G. H. KELLEY.
STARTER FOR AUTOMOBILE ENGINES.
APPLICATION FILED JULY 21, 1911.
1,035,091.
Patented Aug. 6, 1912.
2 SHEETS—SHEET 1.
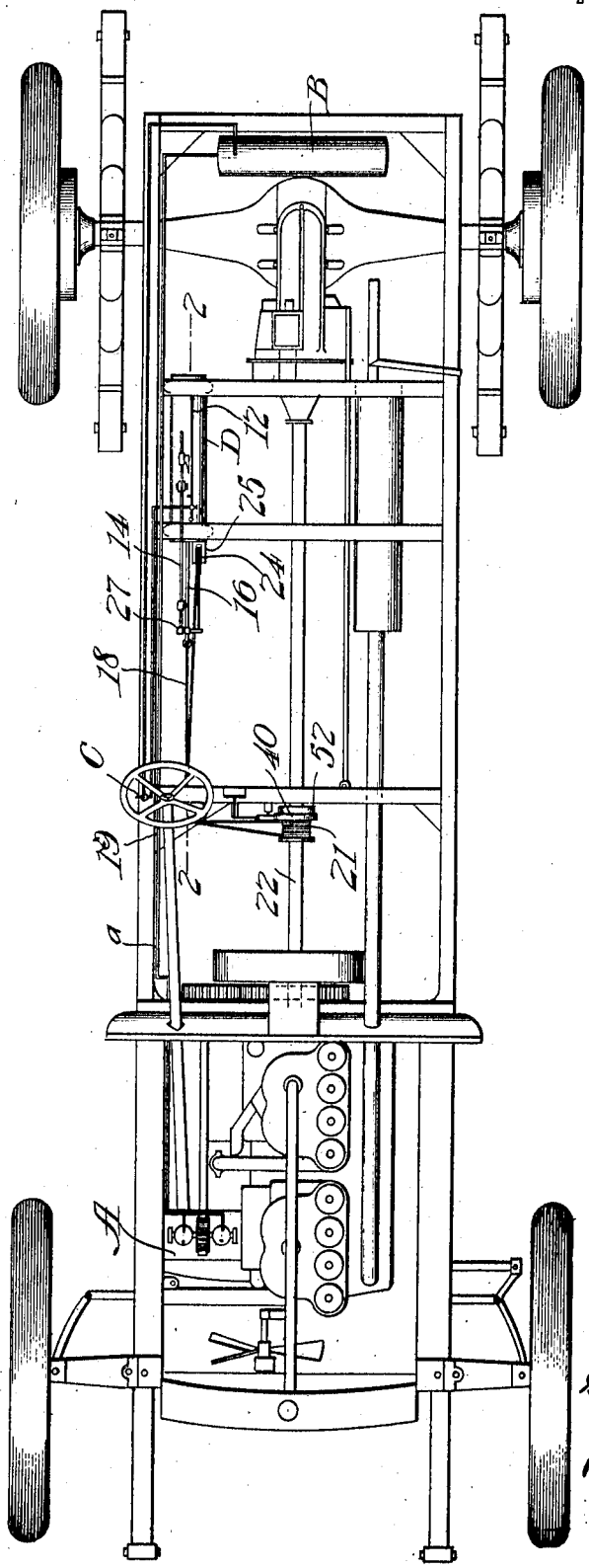

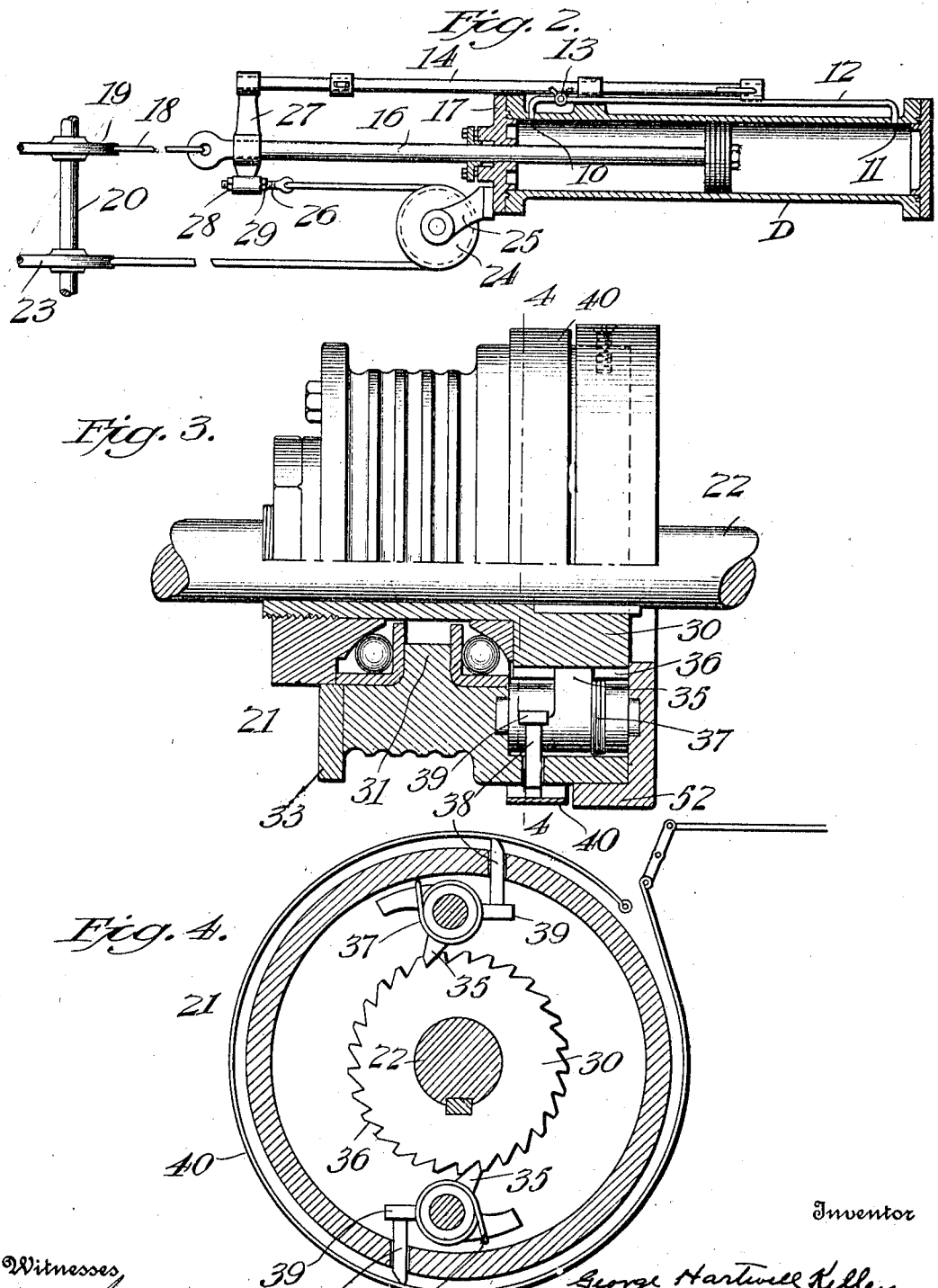

UNITED STATES PATENT OFFICE.

GEORGE HARTWELL KELLEY, OF GAINESVILLE, FLORIDA.

STARTER FOR AUTOMOBILE-ENGINES.

1,035,091.    Specification of Letters Patent.    Patented Aug. 6, 1912.

Application filed July 21, 1911. Serial No. 639,816.

*To all whom it may concern:*

Be it known that I, GEORGE HARTWELL KELLEY, a citizen of the United States, residing at Gainesville, in the county of Alachua and State of Florida, have invented certain new and useful Improvements in Starters for Automobile-Engines, of which the following is a specification.

My said invention consists in various improvements in the construction and arrangement of parts of starters for explosive engines particularly of that class operated by an auxiliary engine, it being adapted especially for use on automobiles and has for its purpose to provide means whereby such an engine may be readily started from the seat of the operator and one which will operate positively and certainly at all times, all as will be hereinafter more fully described and claimed.

Referring to the accompanying drawings which are made a part hereof and on which similar reference characters indicate similar parts, Figure 1 is a plan view of an automobile frame-work and running gear having my starter device applied thereto, Fig. 2 a detail sectional view on an enlarged scale on the dotted line 2—2 in Fig. 1, Fig. 3 a detail view partly in section and partly in elevation of the clutch on the engine shaft, and Fig. 4 a cross section on the dotted line 4—4 in Fig. 3.

The frame-work and running gear is, or may be, of any approved construction and needs no special description being shown merely to illustrate the location of the parts of the apparatus constituting my invention and make clear the operation of the device.

In said drawings the portions marked A represent the air compressor, B the compressed air storage cylinder, C an operating valve, and D an air operated engine or motor. Said parts are, in themselves, of any approved form or construction suitable for the purpose and require no special description. The air compressor A is connected with the engine and operated in the usual, or any approved manner. A pipe *a* extends from said air compressor to the storage tank B by which the desired pressure of air may be maintained in said storage tank and an automatically acting cut-off of common form is provided for regulating the pressure in said tank as may be desired.

The cylinder D is provided with ports 10 and 11 near its respective ends which serve alternately as inlet and exhaust ports being connected by a pipe 12 provided with a three-way valve 13 connected to a reciprocating rod 14 by which said valve is operated to admit compressed air alternately first on one side of piston 15 and then to the other. Said piston 15 has a piston rod 16 which extends through the head 17 of said cylinder and has an eye on its outer end by which it is connected to a flexible connection such as a cable, or chain, 18, which passes over a sheave 19 on idler shaft 20, then around a spool 21 mounted loosely on engine shaft 22, then back around another sheave 23 on idler shaft 20, then back and around a sheave 24 pivoted in a bracket 25 on the end of cylinder D, then to an eye-bolt 26 mounted in a cross-head 27 carried by piston rod 16. Said cross-head 27 also carries reciprocating rod 14, as indicated in the drawings. Said eye-bolt 26 is preferably formed adjustable in its seat by means of nuts 28 and 29 in order to take up any slack, or compensate for any stretch, or wear, in the cable, chain, or other flexible connection. Spool 21 is mounted around a center clutch part 30 which is keyed to engine shaft 22. The connection of these parts is best shown in Figs. 3 and 4 which shows an annular ball-race between parts 21 and 30 on each side of a central flange 31 on the interior of spool 21. An end cap 52 is mounted on one end of said spool 21 and an end plate 33 on the other end by which the parts are held together with the spool adapted to revolve freely on the clutch part 30 when the clutches are disengaged. Pivoted pawls 35 are mounted on opposite sides of part 21 and adapted to engage with ratchet teeth 36 on the clutch part 30. Springs 37 are provided for holding said pawls normally into engagement with said ratchet teeth. Sliding detents 38 are mounted in the rim of spool 21 with their inner ends adapted to bear against transversely extending wings 39 on the sides of pawls 35 opposite the springs 37. A band brake 40 surrounds the rim of spool 21 and is adapted to bear on the outer ends of said sliding detents 38. By means of a lever in a convenient position to be operated by the operator and suitable connections said band brake 40 may be operated to force detents inward and throw pawls 35 out of engagement with the ratchet teeth 36 when desired, as will be presently described.

In operation, the storage tank B being filled with air under the required pressure by air compressor A, in the usual manner, and said tank B being connected with cylinder D by the pipe 12, having the valve 13, and it being desired to start the engine, the operator opens said valve 13 to permit compressed air to pass to the appropriate side of piston 15, which drives said piston toward the opposite end of cylinder D and through the piston rod 16 and flexible connection 18 operates to turn spool 21 on the engine shaft 22. The band brake 40 has been released and springs 37 have operated to throw pawls 35 into engagement with the ratchet teeth 36 on clutch part 30, locking said spool 21 to the engine shaft 22 so that the rotation of spool 21 operates to turn said engine shaft. When piston 15 reaches either end of cylinder D the connection between reciprocating rod 14 and valve 13 will reverse said valve, turning the compressed air into the opposite end of the cylinder and opening the port at the other end for the exhaust, which will drive piston 15 in the opposite direction and reciprocate piston 15 back and forth in cylinder D rapidly and continue the rotation of spool 21 and engine shaft 22 until the ignition has taken place and the engine begun to operate under its own power. The operator then applies band brake 40, which not only throws the pawls 35 out of engagement with the ratchet teeth 36 but also stops the rotation of spool 21. At the same time valve 13, is set in closed position and the air operated motor ceases its work.

It will be understood, of course, that the operation of band brake 40 and the throwing of the pawls 35 out of operative position is only for the purpose of relieving the operation of the machine from unnecessary noise, but is not essential to the successful operation of the invention.

I may also utilize the compressed air in storage tank B for inflating tires by providing suitably arranged nipples and pipes for connection between the tire nipple and said cylinder so that said tires may be maintained at a uniform pressure without manual labor.

While I have used the term "spool" to define the gear by which the flexible connection is connected with the engine shaft, it will be understood, of course, that any form of gear found appropriate may be used and that other changes in details may be made without departing from my said invention as defined in the appended claims.

Having thus fully described my said invention, what I claim as new and desire to secure by Letters Patent, is:

1. An engine starter comprising a compressed air storage cylinder, means for compressing air therein, a single cylinder air motor, a reciprocating piston driven thereby, means for controlling the inlet and exhaust of air to reciprocate said piston, a spool connected to the engine shaft by a clutch mechanism, said clutch mechanism, a flexible connection connected at both ends to said piston and running around said spool at an intermediate point and also over an idler sheave at a point behind its connection with said piston, and said idler sheave, substantially as set forth.

2. An engine starter comprising an auxiliary reciprocating single cylinder engine, a spool on the engine shaft, clutch mechanism connecting said spool with said engine shaft, a flexible connection running from the piston rod over intermediate sheaves around said spool and then back over an idler sheave located behind the connection with said piston rod then forward and connected at its other end to said piston rod, and said idler sheave, substantially as set forth.

3. An engine starter comprising a compressed air motor mounted on the frame of the machine, a compressed air storage cylinder, a connection from said storage cylinder to said motor, a reciprocating piston in said motor, a piston rod connected therewith and extending outside of said motor, means carried by said piston rod for controlling the inlet and exhaust to said motor, a spool on the engine shaft, clutch mechanism connecting said spool with said engine shaft, means for operating said clutch mechanism, a flexible connection extending from said piston rod around appropriately located idler sheaves around said spool on said engine shaft back to a point behind the inward stroke of the outer end of said piston rod around an idler sheave located at said point then forward and connected to said piston rod at its outer end, and said idler sheave, substantially as set forth.

4. An engine starter comprising a reciprocating power driven piston rod, a flexible connection both ends of which are connected to said piston rod at the same point, one extending forward around idler sheaves and the other end extending rearward around an idler sheave the intermediate portion surrounding a spool on the engine shaft, said spool, and clutch mechanism for coupling said spool to said engine shaft, substantially as set forth.

5. In an engine starter, the combination of a reciprocally driven part, a flexible connection between said reciprocally driven part and a spool on the engine shaft, said spool, clutch mechanism connecting said gear with the engine shaft comprising a loosely mounted spool surrounding a center keyed to said shaft, said center having ratchet teeth and said spool carrying pivoted pawls adapted to engage therewith, said spool being mounted on said center by means of balls running in ball-races between said two parts, means for normally holding said pawls in operative engagement, and a band brake for disengaging said pawls and arresting the rotation of said spool, substantially as set forth.

6. An engine starter comprising a reciprocally driven part, means for driving said part, a flexible connection, clutch mechanism connecting said part with the engine shaft consisting of a center keyed to said engine shaft, a spool adapted to revolve freely on said center, pivoted pawls on said spool adapted to engage and lock the same with said center in one direction, springs for normally holding said pawls into engagement with said ratchet, sliding detents for throwing said pawls out of engagement with said ratchet, a band brake for operating said sliding detents and locking said spool, and means for operating said band brake, substantially as set forth.

In witness whereof, I have hereunto set my hand and seal at Washington, District of Columbia this 18th day of July, A. D. nineteen hundred and eleven.

GEORGE HARTWELL KELLEY. [L.S.]

Witnesses:
E. W. BRADFORD,
CHAS. E. RIORDAN.

---

Copies of this patent may be obtained for five cents each, by addressing the "Commissioner of Patents Washington, D. C."